(12) United States Patent
St. Amant et al.

(10) Patent No.: US 8,337,585 B1
(45) Date of Patent: Dec. 25, 2012

(54) COUNTER FLOW SCRUBBER COLUMN AND METHOD FOR REMOVING VOLATILE ORGANIC COMPOUNDS FROM A FLUID STREAM

(75) Inventors: Jefferey St. Amant, League City, TX (US); Kenneth R. Matheson, Corpus Christi, TX (US)

(73) Assignee: Vapor Point, LLC, La Porte, TX (US)

( * ) Notice: Subject to any disclaimer, the term of this patent is extended or adjusted under 35 U.S.C. 154(b) by 422 days.

(21) Appl. No.: 12/492,087

(22) Filed: Jun. 25, 2009

(51) Int. Cl.
*B01D 53/14* (2006.01)

(52) U.S. Cl. ............. 95/8; 95/11; 95/12; 95/13; 95/211; 95/237

(58) Field of Classification Search .................. 95/8, 11, 95/13, 187, 211, 237–240; 96/244, 255, 96/263–265, 290, 300
See application file for complete search history.

(56) References Cited

U.S. PATENT DOCUMENTS

| | | | | |
|---|---|---|---|---|
| 4,662,900 A * | 5/1987 | Ottengraf | ....................... | 435/266 |
| 5,122,165 A * | 6/1992 | Wang et al. | ....................... | 95/92 |
| 5,232,676 A * | 8/1993 | Wolff et al. | ................... | 423/210 |
| 5,279,963 A * | 1/1994 | Hobby | ........................ | 435/266 |
| 5,698,011 A * | 12/1997 | Chung et al. | ....................... | 95/45 |
| 5,862,819 A * | 1/1999 | Cradeur | ........................... | 134/61 |
| 5,985,649 A * | 11/1999 | Stensel et al. | ................. | 435/266 |
| 6,143,553 A * | 11/2000 | Teller | ............................ | 435/266 |
| 6,294,373 B1* | 9/2001 | van Lith | ........................ | 435/266 |
| 7,147,689 B1* | 12/2006 | Miller | ............................... | 95/92 |
| 7,597,803 B2* | 10/2009 | Spani | ............................ | 210/180 |
| 2002/0044895 A1* | 4/2002 | Nickens et al. | ............... | 422/168 |
| 2003/0094100 A1* | 5/2003 | Page | ............................... | 95/263 |

* cited by examiner

*Primary Examiner* — Duane Smith
*Assistant Examiner* — Ives Wu
(74) *Attorney, Agent, or Firm* — Buskop Law Group, PC; Wendy Buskop

(57) ABSTRACT

A counter flow scrubber column and method for removing volatile organic compounds from a fluid stream using a packed column, a columns with trays and a biodiesel or a biomass and allowing a user to view the status of the cleaned vapor using an executive dashboard 24 hours a day, 7 days a week.

5 Claims, 3 Drawing Sheets

COUNTER FLOW SCRUBBER COLUMN AND METHOD FOR REMOVING VOLATILE ORGANIC COMPOUNDS FROM A FLUID STREAM

FIELD

The present embodiments generally relate to a counter flow scrubber column and method for removing volatile organic compounds from a fluid stream using a packed column, a columns with trays and a biodiesel or a biomass.

BACKGROUND

A need exists for individual scrubber columns to inexpensively process hydrocarbon fluid streams to at least 96 percent.

A need exists for a portable and moveable scrubber that can be easily transported on a highway without additional permits that can remove up to 99 percent volatile organics (VOC) from a stream.

A further need exists for a system that recycles material used with packing, such as biomass, until the biomass or biodiesel fully absorb the volatile organic compound (VOC) for delivery of cleaned vapor at low pressures and generally low temperatures, so that less electricity is used by the manufacturer, making the recycle process easy.

A need exists for a method that can be used remotely on a platform for recycling contaminants from a fluid stream and be monitoring from a home location using an executive dashboard for 24/7 continuous monitoring on individual client devices by a group of executives of a company to comply with Environmental Protection Agency (EPA) regulations and prevent fines and prevent toxins from entering the atmosphere.

The present embodiments meet these needs.

BRIEF DESCRIPTION OF THE DRAWINGS

The detailed description will be better understood in conjunction with the accompanying drawings as follows.

Figure 1:
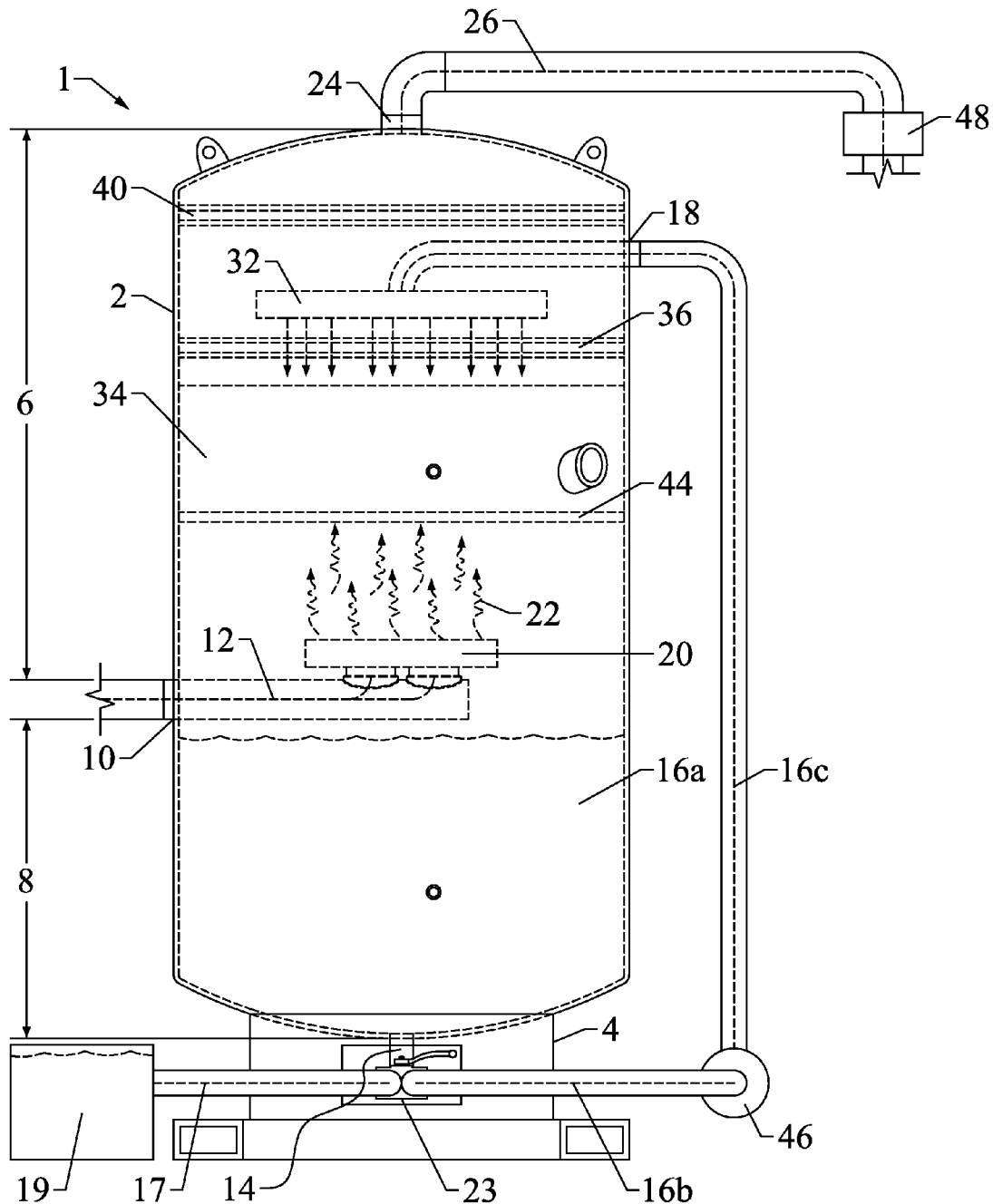
FIG. 1 is a diagram of a counter flow scrubber column used in an embodiment of the invention.

The present embodiments are detailed below with reference to the listed Figures.

DETAILED DESCRIPTION OF THE EMBODIMENTS

Before explaining the present system and method in detail, it is to be understood that the system is not limited to the particular embodiments and that it can be practiced or carried out in various ways.

The present embodiments relate to a counter flow scrubber column and method for removing volatile organic compounds from a fluid stream using a packed column, a columns with trays and a biodiesel or a biomass.

The embodiments can apply to various fluids, which can include fluid streams, such as hydrocarbon fluid streams which contain volatile organic compounds (the phrase volatile organic compounds are also referred to herein as "VOC").

The term "fluid stream" as used herein can refer to a source of hydrocarbon fluid, from a process or a well and can be named for an offshore production facility from which the hydrocarbon stream originates, such as, a spar, tension leg platform, a semisubmersible, a jack up rig, a barge, another floating vessel, a subsea tie back, or an onshore geophysical source and can include a multiphase fluid.

The embodiments can also enable an owner of a stream, gaseous, liquid, or vapor containing, or combinations of these, having volatile organic compounds, like an aromatic chemical, to track the status of their cleaned vapor streams regardless of time or day, without having to call a plant operator.

These "contaminated fluid streams" can be partially processed hydrocarbon streams from a refinery, gaseous streams containing vapor and volatile organic compounds, from a chemical plant or even commingled fluid streams from a pipe in a processing plant, at a well hub or at an offshore platform.

A "contaminated fluid stream" can be commingled, such as a gaseous stream, a liquid stream, or a combinations thereof from at least two sources, like two different manufacturing sites each having a different owner that are to be introduced to a counter flow scrubber column of an embodiment and can then be processed with an embodiment of the invention The embodiment can enable an owner of a stream, gaseous or liquid, or vapor containing, or combinations of these, having volatile organic compounds, like an aromatic chemical, to track the status of their cleaned vapor streams regardless of time or day, without having to call a plant operator.

An embodiment can provide a predictive model enabling a buyer to see multiple cleaned vapor streams at multiple locations in multiple processing facility to see concentration changes to plan for turn rounds effectively, and replacement of absorbant in a timely manner to prevent emissions that are wrongful, of what was construed to be "cleaned gas".

The embodiment can further provide a predictive model that can be continually monitored using an executive dashboard and results can be pushed to individual client devices over at least one network.

The term "executive dashboard" can be a software program, that can be a group of computer instructions that can direct a processor to perform a series of analytical steps and a series of display steps for viewing on a client device connected to a network for 24/7 monitoring and decision making.

The embodiment can further be contemplated to be a continuous cleaning process but it can be a batch process as well.

The counter flow scrubber column or similar embodiments can be used on one or more components like: a crude oil, a condensate, a natural gas, a liquefied natural gas, a liquefied petroleum gas, or combinations thereof.

The system can contemplate that the plurality of fluid streams can include at least one production stream, such as an offshore production stream.

The system can contemplate that at least one of the fluid streams can include a pipeline condensate or a "retrograde" condensate.

The cleaned vapor can be further analyzed or treated if need be using gas chromatography, distillation, pressure volume temperature analysis, infrared analysis, titration, thermal spectral analysis, or combinations thereof and results from those analysis can also be transmitted to the executive dashboard for further monitoring by the operators, user, executive or other designated environmental officer of a company treating the fluid stream of gas, liquid, vapor or combinations thereof.

An example of a gas could be a "Methane stream", from an offshore well called Genghis Khan" which can indicate the molecule methane, is in the stream with other volatile organic compounds.

The system can use a worldwide communication network such as the Internet, which can communicate between processors.

The term "biomass" as used herein can refer to biodiesel with about 1 percent by weight to about 3 percent by weight particulate.

The term "biodiesel" as used herein can refer to nonpetroleum based organic product having a viscosity related to the feedstock of the product, and wherein the product can be made of fatty acid methyl esters from cooking oil, animal fats, plants such as algae, or vegetable oils by trans-esterification of those fats, plants and/or oils with alcohol. The biodiesel can have a flashpoint between about 130 Centigrade to about 390 Centigrade. The biodiesel can have a specific gravity of between about 0.87 grams per milliliter to about 0.89 grams per milliliter.

An embodiment of the system can contemplate that the recycle process of the "recycle contaminated fluid" as used herein can refer to biodiesel which has absorbed about 0.87 grams per milliliter, but has not fully absorbed volatile organic compounds to its saturation point.

An embodiment can contemplate that the biodiesel or biomass can be a continuous flowing of about 200 gallons to about 8,000 gallons per day of biodiesel or biomass. In some environments about 10 gallons a minute up to about 2.7 gallons per minute can be contemplated.

An embodiment can include a counter flow scrubber column for removing volatile organic compounds from a fluid stream.

Turning now to FIG. 1, FIG. 1 is a diagram of a counter flow scrubber column used in an embodiment of the invention.

FIG. 1 shows a counter flow scrubber column 1 for removing volatile organic compounds from a fluid stream. The counter flow scrubber column 1 can further comprise a housing 2, which can be a sealable tank that can be rounded, such as a cylinder, or even a ball shape, having a volume between about 50 gallons to about 5,000 gallons, and can further be disposed on a support 4.

The tank can be made of steel, or a steel alloy or even a highly reinforced polymer. The walls of the tank can have a thickness between about $1/16$th to about 2 inches. For steel, the wall thickness of the tank can be about $3/16^{th}$ of an inch.

The tank can support pressures between about 1 atmosphere to about 25 atm without deforming.

The tank can have at least one girder or support arm on the outside, which can enable additional support to hold the tank.

The housing 2, which can also be referred to herein as a "tank" can have an upper portion 6 and a lower portion 8.

The support 4 can be a pedestal, which can be made of steel, and can be capable of supporting between about 2,000 pounds to about 80,000 pounds without deforming.

The housing 2 can have a contaminated fluid inlet port 10, which can be located about the center of the housing 2 between the upper portion 6 and the lower portion 8 for receiving contaminated fluid with volatile organic compounds 12, such as a stream of cumine, which can contain a volatile organic compound known as benzene.

The contaminated fluid inlet port 10 can receive liquids, gases, vapors or combinations thereof at rates that range from about 1 CFM (cubic foot per minute) to about 30,000 CFM.

In an embodiment, the contaminated fluid with volatile organic compounds 12 can be pressurized fluid such as at a psi between about 0.25 atm and as low as 6 inches of water column, to about 25 atm.

The housing 2 can have a recycle contaminated fluid outlet port 14, which can be located in the lower portion 8 of the housing below the contaminated fluid inlet port 10 and can have a three way valve 23 that can allow the following functions. The contaminated fluid outlet port 14 can flow a recycle contaminated fluid 16a which can contain a biodiesel, such as methyl ester of animal fat or a biomass, such as algae oil out of the housing 2, shown as recycle contaminated fluid 16b.

The contaminated fluid outlet port 14 can also flow a saturated biodiesel stream out of the housing. The saturated biodiesel stream can flow out of the housing much the same way as described in FIG. 1 for the recycle contaminated fluid 16a, 16b, 16c. The contaminated fluid outlet port 14 can do these two activities at the same time.

The contaminated fluid outlet port 14 can be used to fill the housing 2 with a clean stream 17, which can be a clean biodiesel stream, shown as coming from reservoir 19. The clean biodiesel stream 19, which can be a biomass stream or a combinations of biodiesel with biomass can be used to cover a packing 34 in the housing 2.

The packing 34 can be ceramic balls, a fiber mesh, a plurality of polymer pellets, walnut shells, drill cuttings, a plurality of vertically oriented trays, sand, and combinations thereof.

A recycle contaminated fluid inlet port 18, which be disposed in the upper portion 6 of the housing 2, can be used for flowing recycle contaminated fluid 16c back into the housing 2 from the contaminated fluid outlet port 14 using a pump 46. It can be contemplated that the pump 46 can be a diaphragm pump available from Aero™ of Denmark that can run at a flow rate of about 0.5 gallons per minute to 300 gallons per minute.

In the housing 2, a contaminated vapor distribution manifold 20 can be disposed, near the contaminated fluid inlet port 10, for dispersing contaminated vapors 22 of the recycle contaminated fluid 16c from the recycle contaminated fluid inlet port 18 in a first direction, which can be a generally upward direction.

A scrubbed vapor outlet 24 can be disposed in the upper portion 6 of the housing 2, which can operate to remove cleaned vapor 26 from the housing.

A sensor 48 can be located adjacent the scrubbed vapor outlet 24 for detecting concentration of the contaminated fluid with volatile organic compounds 12 in the cleaned vapor 26. The sensor 48 can be a PID or RFID sensor, such as those made by Thermo Scientific, a Fisher Company with an office in Waltham, Mass.

A re-distribution manifold 32 can be located in the upper portion 6 of the housing 2 for introducing recycle contaminated fluid 16c into the upper portion 6 of the housing 2 from the recycle contaminated fluid inlet port 18. The recycle contaminated fluid inlet port 18 can receive and pass fluid at a rate of about 4,000 gallons per day to 15,000 gallons per day.

A packing support grid 44 can be used to support the packing 34 and can be disposed between the packing 34 and the contaminated vapor distribution manifold 20.

The packing support grid 44 can support the packing 34 that can allow the contaminated vapors 22 to flow upwardly through the packing 34 while the recycle contaminated fluid 16c from the recycle contaminated fluid inlet port 18 flows downwardly through the packing 34, forming the counter flow scrubber counter.

The packing 34 can receive the recycle contaminated fluid 16c from the re-distribution manifold 32 and can receive the contaminated vapors 22 from the contaminated vapor distribution manifold 20.

A distribution grid 36 can extend across the housing 2 separating the packing 34 and the re-distribution manifold 32.

The distribution grid 36 can have a thickness using API pipe size of between a schedule 20 and a schedule 80 pipe thickness. The distribution grid can be made from steel or polyvinyl chloride.

The distribution grid 36 can be porous and can allow the contaminated vapors 22 to pass through to the scrubbed vapor outlet 24.

A demister 40 such as a Proco™ demister made by Proco of Kingsville, Tex. can be disposed in the housing 2 between the re-distribution manifold 32 and the scrubbed vapor outlet 24 and can serve to coalease the mist.

The system can work wherein prior to introducing contaminated fluid with volatile organic compounds 12 to the housing 2, a clean stream 17, such as a biodiesel stream, can be introduced from a reservoir 19 into the housing 2 through the contaminated fluid outlet port 14 to the recycle contaminated fluid inlet port 18 for wetting the packing 34. For example in a housing of 22 gallons of capacity, then 3 gallons of biodiesel can be used with the packing.

In an embodiment, the counter flow scrubber column 1 can allow for continuous flow into the housing 2 of recycle contaminated fluid 16a with the contaminated fluid with volatile organic compounds 12 and continuous recycling of the recycle contaminated fluid.

More than one sensor 48 can be disposed on the scrubbed vapor outlet. For example, a first sensor can detect temperatures, a second sensor can detect pressure, and a third sensor can detect ppm of VOC or similar contaminates, and a fourth sensor can be used to detect flow rates of the vapor.

Figure 2:
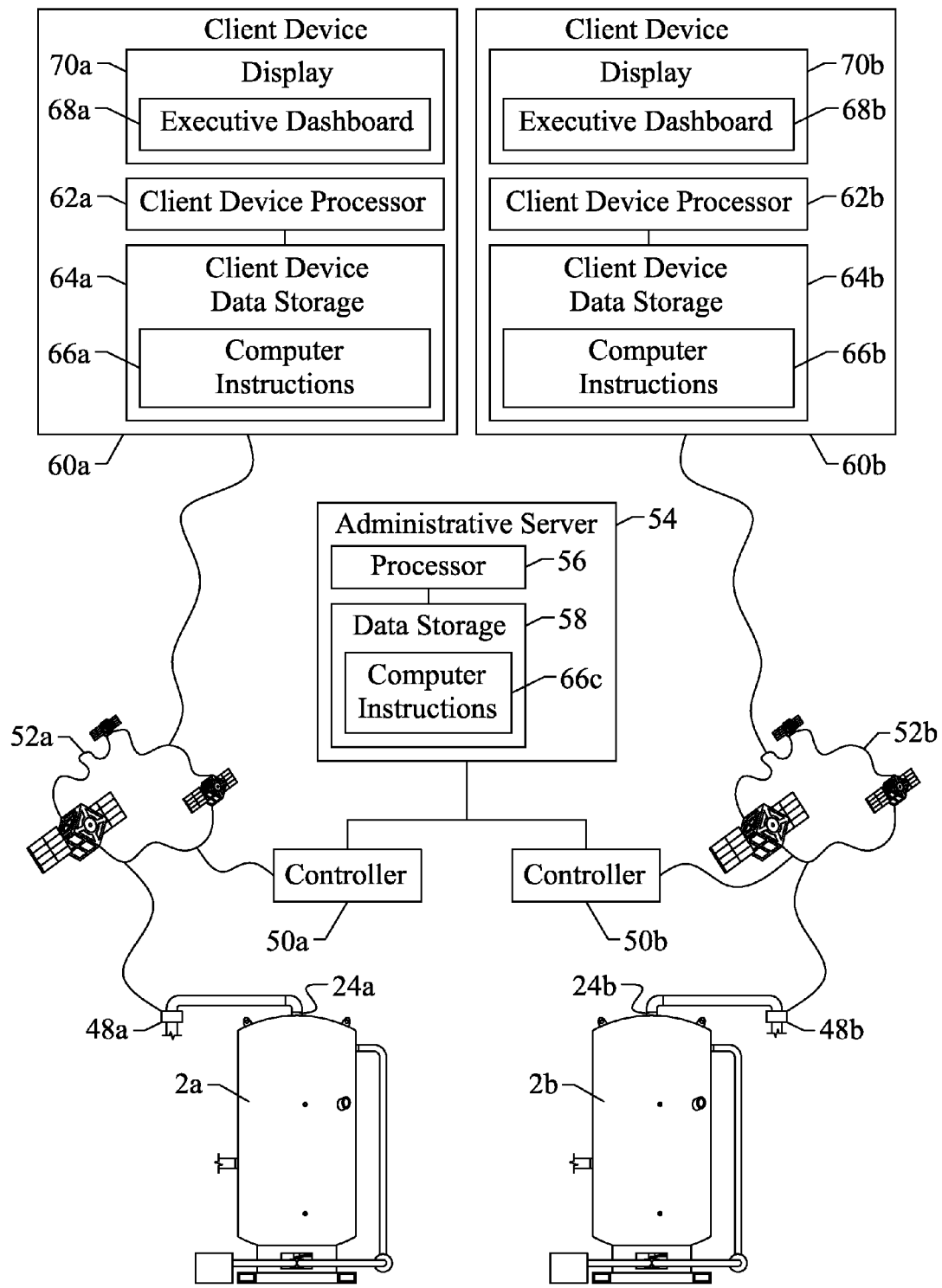
FIG. 2 is a diagram of the networked system of an embodiment of the invention.

An embodiment can contemplate that each sensor 48a, 48b can be connected to a controller 50a, 50b, which can be in communication with at least one network 52a, 52b, as shown in FIG. 2.

FIG. 2, further shows two housings 2a, 2b each shown with a sensor 48a, 48b, which can be in communication with a controller 50a, 50b through two different networks 52a, 52b. One network can be a satellite network, the other network can be a local area network (LAN).

An administrative server 54 can communicate with the controllers 50a, 50b. The controllers can be a personal digital assistant, such as those purchased from Best Buy, a retailer throughout the USA.

The administrative server 54 can have a processor 56, which can be in communication with data storage 58.

The administrative server 54 can be in communication with each controller 50a, 50b, and can be used for monitoring the housings 2a, 2b and scrubbed vapor outlets 24a, 24b instantly over at least one network 52a, 52b.

FIG. 2 also shows two client devices 60a, 60b, which can further have a client device processor 62a, 62b and client device data storage 64a, 64b, which can be in communication with the administrative server 54 over at least one network 52a, 52b.

Client devices 60a, 60b and the administrative server 54 can have computer instructions 66a, 66b, 66c for presenting a concentration of volatile organic compounds of the cleaned vapor on an executive dashboard 68a, 68b and presented on a display 70a, 70b of at least one client device 60a, 60b.

In an embodiment, at least one executive dashboard 68a, 68b can be usable for tracking the concentration of volatile organic compounds over time on at least one client device 60a, 60b. Other tracking can be done as well, such as tracking of temperature in the tank, duration of the project or tracking of flow rates and so forth.

In an embodiment, the controllers 50a, 50b can each have preset limits on concentrations of volatile organic compounds, such as for housing 2a receiving a stream of benzene the preset limit can be 0.5 ppm. For housing 2b receiving a stream of total VOC the preset limit can be 100 ppm.

An embodiment can contemplate that at least one controller 50a, 50b can transmit an alarm to an operator when sensed concentrations of volatile organic components exceed a present limit in the cleaned vapor.

It can also be noted that the biodiesel or biomass in an embodiment can have at least one short chain alkyl ester formed by trans-esterification of plant, fish, bird, or other animal fats.

Figure 3:
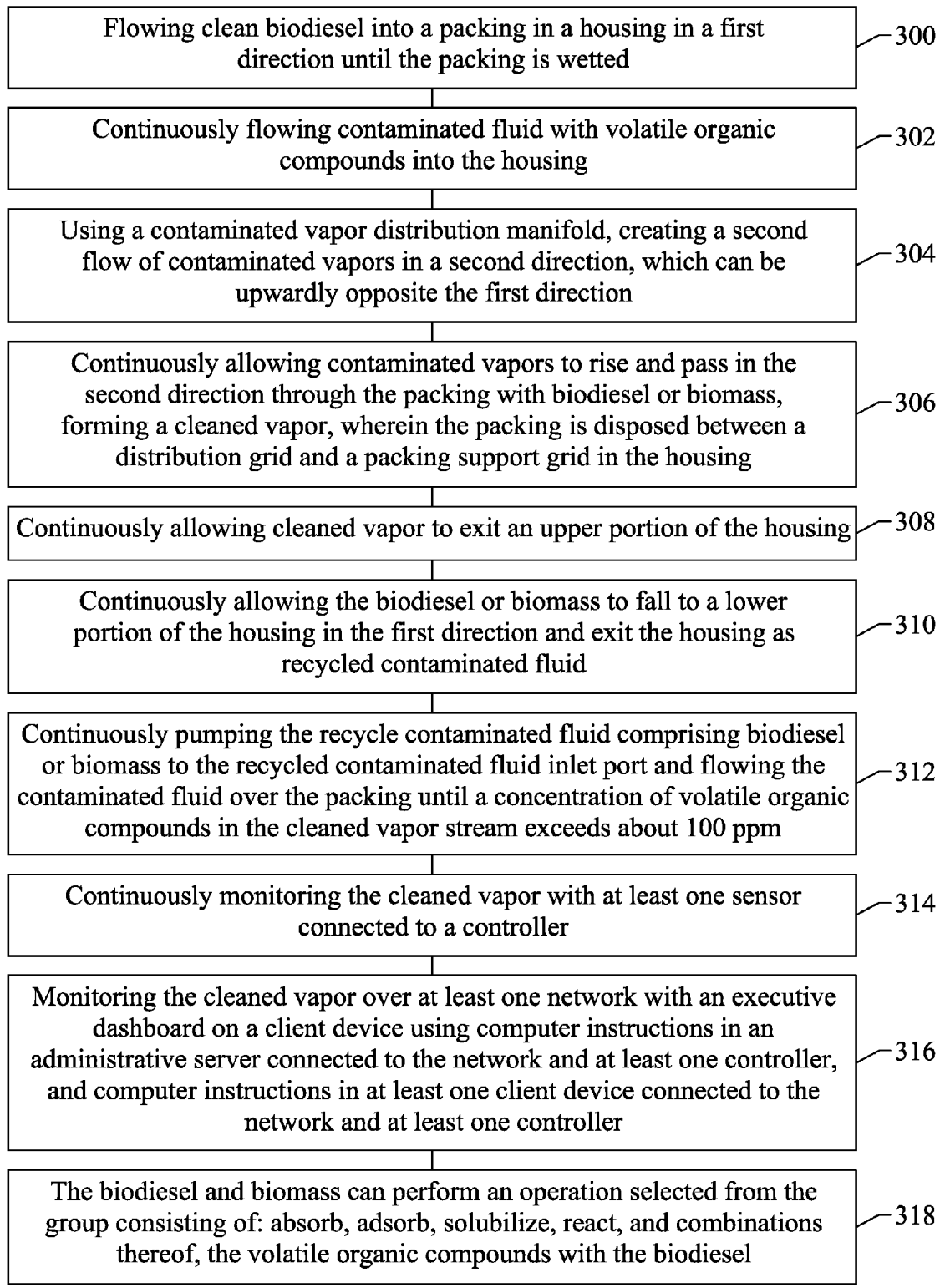
FIG. 3 is a diagram of a method for removing volatile organic compounds from a fluid stream.

FIG. 3 is a diagram of a method for removing volatile organic compounds from a fluid stream.

Step 300 depicts the step of flowing clean biodiesel into a packing in a housing in a first direction until the packing is wetted.

Step 302 involves continuously flowing contaminated fluid with volatile organic compounds into the housing.

Step 304 involves using a contaminated vapor distribution manifold, creating a second flow of contaminated vapors in a second direction, which can be upwardly opposite the first direction.

Step 306 depicts continuously allowing contaminated vapors to rise and pass in the second direction through the packing with biodiesel or biomass, forming a cleaned vapor, wherein the packing is disposed between a distribution grid and a packing support grid in the housing.

Step 308 is continuously allowing cleaned vapor to exit an upper portion of the housing.

Step 310 involves continuously allowing the biodiesel or biomass to fall to a lower portion of the housing in the first direction and exit the housing as recycled contaminated fluid.

Step 312 involves continuously pumping the recycle contaminated fluid comprising biodiesel or biomass to the recycle contaminated fluid inlet port and flowing the contaminated fluid over the packing until a concentration of volatile organic compounds in the cleaned vapor stream exceeds about 100 ppm.

Step 314 can further involve continuously monitoring the cleaned vapor with at least one sensor connected to a controller.

Step 316, wherein the method can involve monitoring the cleaned vapor over at least one network with an executive dashboard on a client device using computer instructions in an administrative server connected to the network and at least one controller, and computer instructions in at least one client device connected to the network and at least one controller.

Step 318, wherein the biodiesel and biomass can perform an operation selected from the group consisting of: absorb, adsorb, solubilize, react, and combinations thereof, the volatile organic compounds with the biodiesel.

While these embodiments have been described with emphasis on the embodiments, it should be understood that within the scope of the appended claims, the embodiments might be practiced other than as specifically described herein.

What is claimed is:

1. A method for removing volatile organic compounds from a fluid stream comprising:
   a. flowing clean biodiesel into a packing in a housing in a first direction until the packing is wetted;
   b. continuously flowing contaminated fluid with volatile organic compounds into the housing;
   c. using a contaminated vapor distribution manifold, creating a second flow of contaminated vapors in a second direction upwardly opposite the first direction;
   d. continuously allowing contaminated vapors to rise and pass in the second direction through the packing with biodiesel or biomass, forming a cleaned vapor, wherein the packing is disposed between a distribution grid and a packing support grid in the housing;

e. continuously allowing cleaned vapor to exit an upper portion of the housing;

f. continuously allowing the biodiesel or biomass to fall to a lower portion of the housing in the first direction and exit the housing as recycle contaminated fluid; and g. continuously pumping the recycle contaminated fluid comprising biodiesel or biomass to the recycle contaminated fluid inlet port and flowing the recycle contaminated fluid over the packing until a concentration of volatile organic compounds in the cleaned vapor stream exceeds 100 ppm.

2. The method of claim 1, further comprising continuously monitoring the cleaned vapor with at least one sensor connected to a controller.

3. The method of claim 1, further comprising monitoring the cleaned vapor over at least one network with an executive dashboard on a client device using computer instructions in an administrative server connected to the network and at least one controller, and computer instructions in at least one client device connected to the network and at least one controller.

4. The method of claim 1, wherein the biodiesel or biomass comprises at least one short chain alkyl ester formed by trans-esterification of plant, fish, bird, or other animal fats.

5. The method of claim 1, wherein the biodiesel and biomass perform an operation selected from the group consisting of: absorb, adsorb, solubilize, react, and combinations thereof, the volatile organic compounds with the biodiesel.

\* \* \* \* \*